United States Patent Office 3,212,583
Patented Oct. 19, 1965

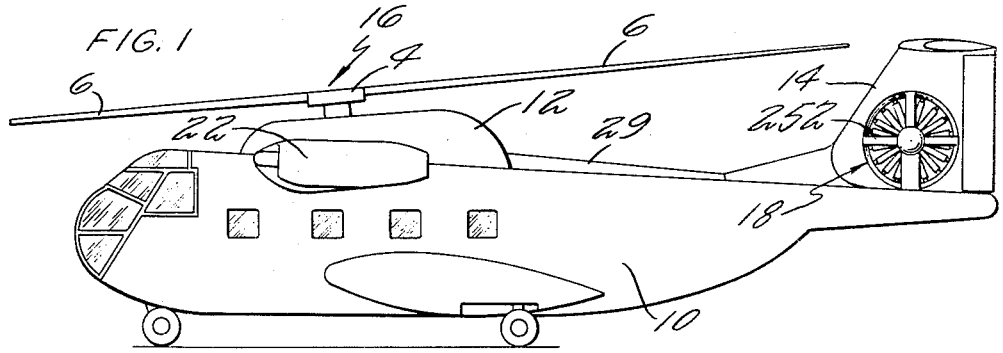
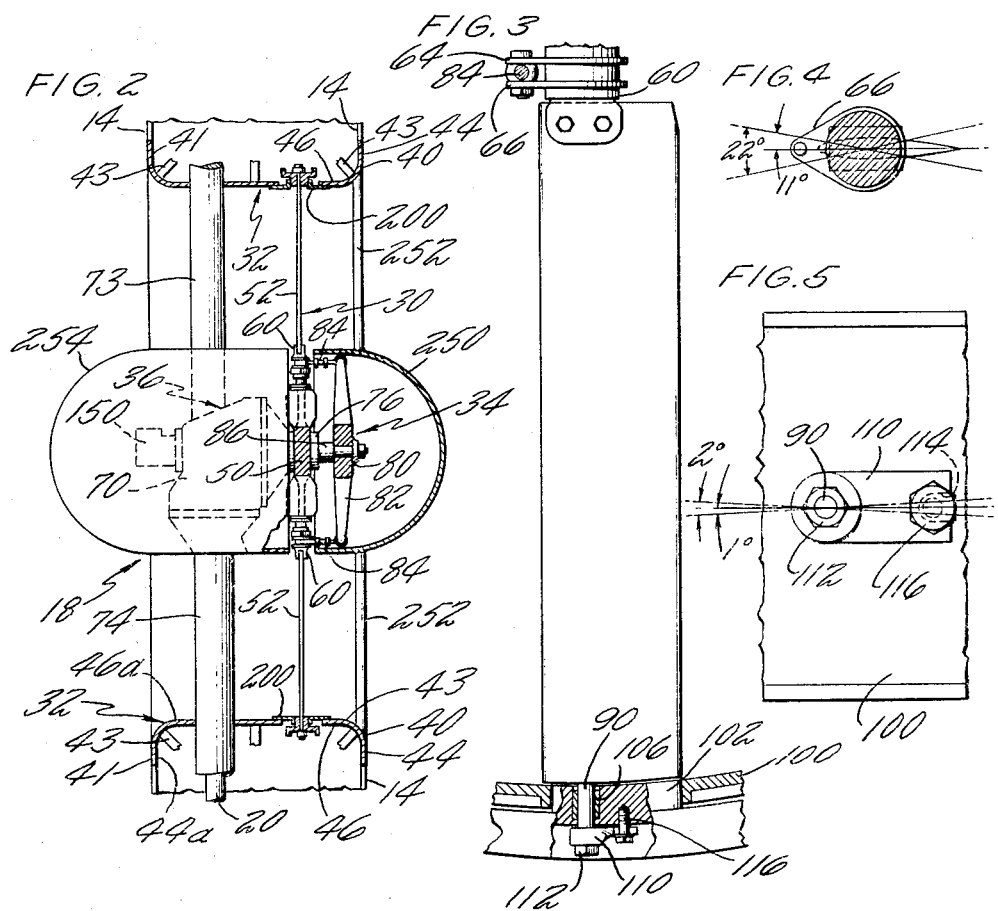
INVENTORS
JAMES H. TODD, JR.
ALFRED A. WOLF JR.
BY Jack N. McCarthy
AGENT

3,212,583
CONTROL FORCE FAN
James H. Todd, Jr., Fairfield, and Alfred A. Wolf, Jr., Milford, Conn., assignors to United Aircraft Corporation, East Hartford, Conn., a corporation of Delaware
Filed May 29, 1964, Ser. No. 371,196
13 Claims. (Cl. 170—160.5)

This invention relates to a control force fan and more particularly for use on a V/STOL aircraft.

An object of this invention is to have a shrouded directional control which is fully reversible.

Another object of this invention is to provide a control fan having blades which are substantially rigid in spanwise bending, however, are sufficiently flexible in torsion so that they can be twisted to large positive and negative angles of attack at the blade root and restrained to small positive and negative angles of attack at the blade tip.

A further object of this invention is to provide a collective pitch mechanism in the hub which will twist the fan blades to their required angle of attack.

Another object of this invention is to provide a rotating blade retainer ring which retains the tips of the blades and seals itself to the shroud while permitting coning.

A further object of this invention is to provide a control fan which will produce a maximum disc loading and a maximum local angle of attack, limited only by an allowable blade element critical mach number.

These and other objects and advantages of the invention will be pointed out in connection with the following detailed description of the drawings in which one embodiment is illustrated.

In the drawings:

FIGURE 1 is a side elevational view of a helicopter with a control force fan shown located in the tail pylon to provide directional control;

FIGURE 2 is a cross-sectional view of the control force fan showing a blade control mechanism:

FIGURE 3 is an enlarged view of one blade showing a control mechanism attachment at the root end and the outboard end connection to the blade retainer ring;

FIGURE 4 is a section taken at the root end showing the maximum blade angle movement at that point; and FIGURE 5 is an enlarged fragmentary view of the outer periphery of the blade retainer ring showing a blade tip restraining means.

Referring to FIG. 1, the helicopter embodying the invention comprises an essentially elongated fuselage 10 having a main rotor pylon 12 and a tail fan pylon 14 on which are mounted the main rotor generally indicated at 16 and a control force fan generally indicated at 18. The main rotor 16 comprises a rotor head 4 having rotor blades 6 mounted thereon for pitch changing movement. The control system for this helicopter can have any operable design and could be such as that shown in U.S. application Serial No. 171,331.

In the helicopter structure shown, a jet engine 22 is located on each side of the main rotor pylon 12 adjacent the upper part of the fuselage 10. These two engines provide the power plant section and drive a main transmission. This main transmission turns the main rotor and the shaft for turning the control force fan. A control force fan shaft housing 29 covers this shaft. The helicopter is supported on the ground by conventional landing gear.

The control force fan 18 comprises four main parts. These parts are: (1) the shroud 32, (2) the fan 30, (3) the driving mechanism 36, and (4) the control mechanism 34.

The stationary shroud 32 includes two annular members 40 and 41 which are fixed to the rear fan pylon 14. The member 40 has a flat outwardly extending portion 44 which mates and fairs with one side of the fan pylon 14 and an inwardly directed cylindrical portion 46. Member 41 has a similar flat outwardly extending portion 44a which mates and fairs with the other side of the fan pylon 14 and an inwardly projecting portion 46a. The inwardly directed cylindrical portions 46 and 46a are of the same diameter and their inner ends are separated to form an opening therebetween of a constant width for a purpose to be hereinafter described. A curved portion connects each of the outwardly extending portions 44 and 44a with its cooperating cylindrical portions 46 and 46a, respectively. Each of the members 40 and 41 can be structurally supported by the rear fan pylon 14 by any known means desired. For example, the outwardly extending portions 44 and 44a could be bonded to the skin of the pylon where they meet and supporting members 43 connected to the aircraft fuselage could be used to add strength.

The control force fan 30 comprises a rotor hub 50 having a plurality of blades 52 located thereon for pitch changing movement. Each blade having a blade attaching member 60 at its root end. Each blade attaching member being pivotally mounted on the periphery of the rotor hub by thrust bearings located between the rotor hub and the blade attaching members of the root ends of the blades. The specific manner in which the blades are mounted around the periphery of the rotor for pitch change does not form part of the invention disclosed.

Each blade attaching member 60 includes a pitch change horn which extends substantially in the plane of the blade in a forward direction. In the device shown, each pitch change horn comprise two like flanges 64 and 66 which project in the same direction and are located a small distance apart. The free ends of each pair of projections 64 and 66 are connected to the control mechanism 34 in a manner to be hereinafter described.

The driving mechanism 36 includes a transmission unit 70 which is mounted in the center of the duct formed by the cylindrical portions 46 and 46a. This unit 70 is shown supported by members 73 and 74 which extend in to the fuselage of the aircraft. While 73 can be solid, 74 is hollow to accommodate the drive shaft 20 which is driven by the tail fan shaft extending from the main transmission. This shaft 20 drives the transmission which in turn rotates the rotor hub 50 by shaft 76. The shaft 76 on which the rotor hub 50 is fixedly connected is hollow for a purpose to be hereinafter described. A driving mechanism of this type is shown in U.S. Patent No. 2,795,284.

The control mechanism 34 consists of a pitch changing beam 80 having an arm 82 for each pitch horn on each of the plurality of blades. The free end of each arm 82 is connected to its cooperating pitch horn by a link 84. Each end of the link uses a ball joint type connection and is made adjustable in length to make allowances for production tolerances. The pitch changing beam 80 is mounted on the free end of a rod 86 which extends through the center of the rotor hub 50 and its drive shaft 76 to a servo mechanism 150 which can axially move the rod 86 with respect to the rotor hub. This servo mechanism has its operating control in the pilot's compartment. It can be seen that as the shaft 86 and pitch changing beam move in relation to the rotor hub 50, the arms 82 of the pitch changing beam will rotate the blade attaching members with respect to the rotor hub about their pitch changing axes thereby changing the pitch of the blades. The control mechanism is constructed to move the pitch changing beam 80 in a range which will move the root end of the blades between a predetermined large positive and large negative angle of attack. An angle of 11° is considered a large angle in this case, making a total range of 22°. A control of this type is shown in U.S. Patent No. 2,795,284.

The tips of each blade 52 have a short shaft 90 extending radially therefrom along the blade pitch axis. Each of these shafts 90 are positioned in a blade retainer ring 100 which encircles the tips of the blades. This blade retainer ring 100 extends into the annular opening of constant width located between the inner ends of the cylindrical portions 46 and 46a of members 40 and 41. The blade retainer ring 100 has an inwardly extending projection 102 around its inner periphery for each blade and has its outer periphery formed as a channel member. Each projection 102 has an opening therethrough with a bushing 106 inserted therein. Each bushing 106 receives the mating shaft 90 of the cooperating blade 52. The free end of the short shaft 90 extends into the channel of the outer periphery and has a blade tip angle restrainer 110 fixed thereto.

An annular seal 200 has a plurality of openings therein to receive each of the inwardly extending projections 102 for each of the blades. The seal 200 has a width which is greater than the width of the annular space to an extent which will permit the blades to cone slightly while the seal maintains the space closed. The mating portions of the seal 200 and cylindrical portions 46 and 46a are formed having bearing surfaces in view of the relative motion between them. The seal member 200 can be formed of two split ring sections fixed together.

The blade restrainer 110 can be splined to the end of the shaft 90 or pinned thereto. A lock nut 112 holds the restrainer in place. The restrainer projects along the length of the channel a short distance and has a notch 114 in the end thereof. The notch 114 is placed around a pin 116 which can be a threaded bolt. It can be seen that as the blade rotates about the short shaft 90, the short shaft can only rotate for the distance permitted by the extent of the notch 114. This angle movement is retained to approximately 2°; a 1° positive end and a 1° negative angle from a flat pitch.

A blade which will permit this amount of twist between the tip end and root end, that is, a blade which will permit a twist having a large angle of twist at its root end and a small angle of twist at its tip end could be made up of a flat metal sheet, of Fiberglas, or constructed by having aluminum ribs attached to a steel tube with the ribs covered by a Fiberglas skin. The tube could have a varying section along its length to control the variation of twist throughout the blade if desired.

A faired hub 250 is positioned over the pitch changing beam 80 and held in place by arms 252 which extend to the annular member 40. A faired hub 254 is positioned over the transmission 70 and fixed to the members 73 and 74. It can be seen that the shroud formed of the members 40 and 41 will allow a smooth flow of air in either direction into the fan and help retain blade tip losses to a minimum. The fan blades are of a constant chord symmetrical series airfoil with a linear decrease in blade section thickness from root to tip. While the control fan is shown in a vertical position, it must be realized that it can be used in a horizontal wing surface or other surfaces in other positions and is not limited for use in a specific fluid. Further, while only a collective pitch changing mechanism has been shown and described, the shroud and fan can be used with other control devices such as a device for cyclically changing the pitch of the blades, or such as a regular helicopter rotor control having means for both collective and cyclic pitch control.

The seal 200 is used to prevent turbulence in the high efficiency blade tip zone. Because it moves at the highest velocity, the air on the inboard side of the seal is at the lowest pressure while the air on the outboard side is at atmospheric. The difference in pressures would cause the atmospheric air to rush into the path of the high velocity air destroying its smooth flow without the seal.

It is to be understood that the invention is not limited to the specific description above or other specific figures, but may be used in other ways without departure from its spirit as defined by the following claims.

We claim:

1. A shrouded fan comprising a rotor, a plurality of blades extending radially from the rotor, a retaining ring encircling the blade tips, means for connecting the blade tips to the retaining ring and restricting pitch movement between the blade tips and ring, and means connected to the inboard ends of the blades for moving said inboard ends about their spanwise axes for varying the pitch of the blades.

2. In a fan having a hub and a plurality of blades extending radially therefrom, a substantially rigid annular means interconnecting the outer tips of the blades and substantially limiting relative pitch movement between the blades and said means, and means for varying the pitch of the inboard ends of the blades.

3. In a fan having a hub and a plurality of blades extending radially therefrom, a substantially rigid annular member interconnecting the outer tips of the blades and substantially limiting relative pitch movement between the blades and said member, and means for collectively varying the pitch of the inboard ends of the blades.

4. In combination, a duct, a rotor mounted in said duct for rotation, a plurality of blades mounted on said rotor for pitch changing movement, means for retaining the tips of said blades in a spaced relation in a peripheral direction, said last-named means including means for limiting the pitch change at the tip of each blade to a small angle, control means for placing a larger angle of pitch on each blade at its root.

5. A control fan having in combination:
  (a) a duct,
  (b) a rotor,
  (c) means supporting said motor in said duct for rotation,
  (d) said rotor including blades mounted therearound for pitch changing movement,
  (e) a retaining means connected between the tips of a plurality of said blades,
  f) means for rotating said blades changing their pitch, and
  (g) means extending between said retaining means and each of said blades for placing a differential amount of pitch on each blade between its root end and tip end above a predetermined pitch angle.

6. A control fan having in combination:
  (a) an annular duct,
  (b) a rotor mounted in said duct for rotation,
  (c) said rotor including a plurality of blades extending therefrom and mounted for pitch changing movement,
  (d) said duct having an annular space therearound,
  (e) the tips of said blades being interconnected by a blade retainer ring means,
  (f) said retainer ring means extending into the space provided in the duct,
  (g) sealing means connected to said retainer ring means to seal the annular space on each side of the ring means, and
  (h) a blade tip angle restrainer limiting the pitch changing movement of the tip end to a small angle range.

7. A control fan having in combination:
  (a) an annular duct,
  (b) a rotor supported in said duct for rotation,
  (c) said duct having an annular space therearound,
  (d) a blade retainer ring means adapted to be located in said annular space,
  (e) a plurality of blades extending between said rotor and said retainer ring means,
  (f) each of said blades being pivotally mounted at its root end to the rotor and at its tip end to the retainer ring means, (g) means for changing the pitch of each blade connected to its root end,
(h) means for restraining pitch movement of the tip end above a predetermined angle.

8. A control fan having in combination:
(a) an annular duct,
(b) a rotor supported in said duct for rotation,
(c) said duct having an annular space therearound,
(d) a blade retainer ring means adapted to be located in said annular space,
(e) a plurality of blades extending between said rotor and said retainer ring means,
(f) first means pivotally mounting each of said blades at its root end to the rotor,
(g) second means pivotally mounting each of said blades at its tip end to the retainer ring means,
(h) means for changing the pitch of each blade connected to its root end,
(i) said second means including:
 (1) a short shaft extending from the tip end of the blade,
 (2) bearing means in said blade retainer ring means receiving said shaft,
 (3) said shaft extending through said blade retainer ring means to its outer periphery,
(j) means for restraining pitch movement of the tip end above a predetermined angle,
 (1) said last-named means having a connection between the end of said shaft projecting through said ring means and said ring means.

9. A control fan having in combination:
(a) an annular duct,
(b) a rotor supported in said duct for rotation,
(c) said duct having an annular space therearound,
(d) a blade retainer ring means adapted to be located in said annular space,
(e) a plurality of blades extending between said rotor and said retainer ring means,
(f) first means pivotally mounting each of said blades at its root end to the rotor,
(g) second means pivotally mounting each of said blades at its tip end to the retainer ring means,
(h) means for changing the pitch of each blade connected to its root end,
(i) said second means including:
 (1) a short shaft extending from the tip end of the blade,
 (2) bearing means in said blade retainer ring means receiving said shaft,
 (3) said shaft extending through said blade retainer ring means to its outer periphery,
(j) means for restraining pitch movement of the tip end above a predetermined angle,
 (1) said last-named means including an arm projecting radially from the end of said shaft extending through said blade retainer ring means,
 (2) means fixed to the outer periphery of said ring means restricting the angle through which said arm can move.

10. A control fan having in combination:
(a) an annular duct,
(b) a rotor supported in said duct for rotation,
(c) said duct having an annular space therearound,
(d) a blade retainer ring means adapted to be located in said annular space,
(e) a plurality of blades extending between said rotor and said retainer ring means,
(f) first means pivotally mounting each of said blades at its root end to the rotor,
(g) second means pivotally mounting each of said blades at its tip end to the retainer ring means,
(h) means for changing the pitch of each blade connected to its root end,
(i) said second means including:
 (1) a short shaft extending from the tip end of the blade,
 (2) bearing means in said blade retainer ring means receiving said shaft,
 (3) said shaft extending through said blade retainer ring means to its outer periphery,
(j) means for restraining pitch movement of the tip end above a predetermined angle,
 (1) said last-named means including an arm projecting radially from the end of said shaft extending through said blade retainer ring means,
 (2) said arm having a notch in its outer end,
 (3) a fixed projection extending from the outer periphery of said ring means into the notch of said arm,
 (4) pitch movement of the tip of each blade being limited in movement by the width of said notch.

11. A control fan having in combination:
(a) an annular duct,
(b) a rotor supported in said duct for rotation,
(c) said duct having an annular space therearound,
(d) a blade retainer ring means adapted to be located in said annular space,
(e) a plurality of blades extending between said rotor and said retainer ring means,
(f) each of said blades being pivotally mounted at its root end to the rotor and at its tip end to the retainer ring means,
(g) means for changing the pitch of said blade connected to its root end,
(h) means for restraining pitch movement of the tip end above a predetermined angle,
(i) sealing means cooperating with said duct and said blade retainer ring means to seal the annular space therebetween,
(j) said sealing means having a width so as to permit coning of said blades to a limited degree.

12. A control fan having in combination:
(a) an annular duct,
(b) a rotor supported in said duct for rotation,
(c) said duct having an annular space therearound,
(d) a blade retainer ring means adapted to be located in said annular space,
(e) a plurality of blades extending between said rotor and said retainer ring means,
(f) each of said blades being pivotally mounted at its root end to the rotor and at its tip end to the retainer ring means,
(g) means for changing the pitch of said blade connected to its root end,
(h) means for restraining pitch movement of the tip end above a predetermined angle,
(i) annular sealing means cooperating with said duct and said blade retainer ring means to seal the annular space therebetween,
(j) said annular sealing means having its outer periphery adjacent both ends slideably engaging the inner periphery of the annular duct adjacent each side of the annular space therein,
(k) said sealing means having relative rotational movement with said duct and relative axial movement with said duct.

13. A control fan having in combination:
(a) an annular duct,
(b) a rotor supported in said duct for rotation,
(c) said duct having an annular space therearound,
(d) a blade retainer ring means adapted to be located in said annular space,
(e) a plurality of blades extending between said rotor and said retainer ring means,
(f) each of said blades being pivotally mounted at its root end to the rotor and at its tip end to the retainer ring means, (g) said blades being constructed to permit small axial movement at the tips of said blades,
(h) said space having a width to permit this movement of the blades,
(i) means for changing the pitch of each blade connected to its root end,
(j) sealing means cooperating with said duct and said blade retainer ring means to seal the annular space therebetween,
(k) said sealing mean shaving a width so as to permit the axial tip movement of said blades while performing its sealing action.

References Cited by the Examiner

UNITED STATES PATENTS

| | | |
|---|---|---|
| 1,782,073 | 11/30 | Piquerez. |
| 1,820,467 | 8/31 | Liska. |
| 2,609,053 | 9/52 | Lee _____ 170—135.22 |
| 2,698,059 | 12/54 | Pullin _____ 170—135.22 |
| 2,722,193 | 11/55 | Brindley _____ 170—168 X |
| 2,996,281 | 8/61 | Creek _____ 253—77 |

FOREIGN PATENTS 880,590   10/61   Great Britain.

SAMUEL LEVINE, *Primary Examiner.*
JULIUS E. WEST, *Examiner.*